March 19, 1929. S. H. CALKINS Re. 17,238

GUIDE AND PATTERN STRIP

Original Filed Sept. 30, 1925

INVENTOR
Stewart Homer Calkins
BY
R. N. Hardie
ATTORNEY

Reissued Mar. 19, 1929. Re. 17,238

UNITED STATES PATENT OFFICE.

SEWARD HOMER CALKINS, OF AUDUBON, NEW JERSEY, ASSIGNOR TO THE TRAITEL MARBLE COMPANY, OF LONG ISLAND CITY, NEW YORK.

GUIDE AND PATTERN STRIP.

Original No. 1,590,149, dated June 22, 1926, Serial No. 59,649, filed September 30, 1925. Application for reissue filed January 10, 1928. Serial No. 245,788.

This invention relates to means for preventing cracks from forming in the finished or wearing surface of floorings made of sand and cement and known as cement floorings.

It is the common practice to prepare an underbed to receive the finished surface when such surface is to be made of a cement composition.

This underbed is usually composed of a cinder fill, being a mixture of sand, cinders and cement, or other suitable composition, and is spread on top of the previously formed floor arches to the required thickness necessary to form a level and even bed.

The finished layer is then applied to the top of the underbed and consists generally of a cement and fine sand base.

The finishing layer is applied while in a wet or plastic condition, after the underbed coat has hardened somewhat, but not enough to prevent a firm bond being formed between the screed layer, and the top or finishing layer.

Cracks frequently form in flooring and wall surfaces constructed of a cement-finish, and it has been found to be difficult to repair the top surfaces of such flooring or wall surface, and practically impossible to entirely remove all evidence of the original crack.

The method usually restorted to in connection with concrete surfaces is to cut out the top surface along the line of the crack and fill in the cut out portion of the top surface with new material.

In such cases the new material generally shrinks in hardening to such an extent that the outer margins of the new material separate from the adjacent margins of the old material of the top surface, and leave two small separated cracks instead of the one original larger crack.

The new material used moreover is generally of a somewhat different shade from that of the old material and the new patch is clearly apparent.

Cut or open joints have been formed in concrete surfaces so that when a crack forms, it may occur along the line of the cut or open joints and not present an objectional appearance.

Such cut or open joints have also been used to enable a section of a flooring to be removed and replaced when a crack appeared therein.

The cut or open joints are formed in the flooring material while such material is in a semi-plastic condition, and in such cases the side walls adjacent said joints dry and shrink in advance of the material forming the body of the sections and the shrinkage of two oppositely disposed walls of a cut or open joint produces a wide crack formed by that double shrinkage.

Where such uneven drying and shrinkage of the different parts of a section takes place moreover, the finished sections do not have a uniform density throughout their area.

In laying terrazzo flooring, pattern and guide strips have been used to aid in avoiding the formation of irregular cracks in such flooring and good results have been obtained from the use of strips of suitable construction.

Such strips are constructed of thin metal and are applied to the screed coat while such coat is in a semi-plastic condition by being pressed into the material forming the screed coat or layer.

But up to the present time it has not been possible to obtain the same results in connection with a cement upper or wearing surface as are obtained by the use of such strips in connection with the screed layer of a terrazzo flooring.

There is no screed coat or layer used in connection with a cement-finished wall or flooring. In such construction the cement coat or layer is applied directly to the foundation which is composed of a cinder fill, being a mixture of cinders, sand and cement.

In applying guide strips to the material forming a flooring or other surface it has heretofore been found necessary to place the strips in position before the top layer or coat is applied, and no guide strip has heretofore been produced that is capable of being pressed into the body of coarse material forming the foundation of a concrete flooring, and at the same time be thin enough to answer the purpose for which such strips are intended.

This invention has for one of its main objects, therefore, to provide a pattern and guide strip that may be advantageously used in connection with flooring and other surfaces, having a cement upper or wearing surface and an underbed of relatively coarse material.

A further object of the invention is t provide a pattern and guide strip adapted to be used with cement flooring or other surfaces to prevent or control the formation of cracks in said surfaces, without the use of cut or open joints.

The invention is also designed to provide a pattern and guide strip having means for maintaining the lateral alignment or straightness of the strip in position, and for so anchoring the strip as to prevent movement thereof in either an upward or downward direction, or any torsional movement thereof.

The invention has for an object also to provide a guide strip of the class described provided with means for locking together adjacent sections of the top layer of a concrete flooring or other surface, and especially adapted to eliminate shrinkage of the cement or plastic finish thereby preventing the air from penetrating on opposite sides of the strip, and for maintaining the same density of the finished surface along the edges of the strip as in other portions remote from the strip.

These and other objects, are accomplished by the means hereinafter described, and illustrated in the accompanying drawings, wherein is shown a preferred embodiment of the invention; but it is to be understood that changes, modifications, and alterations may be made therein, without departing from the invention.

In the accompanying drawings, in which similar reference numerals indicate corresponding parts throughout the several views, Figure 1 is a perspective view of pattern and guide strips embodying the invention arranged in position to form a section of a wall or flooring.

Figure 1:
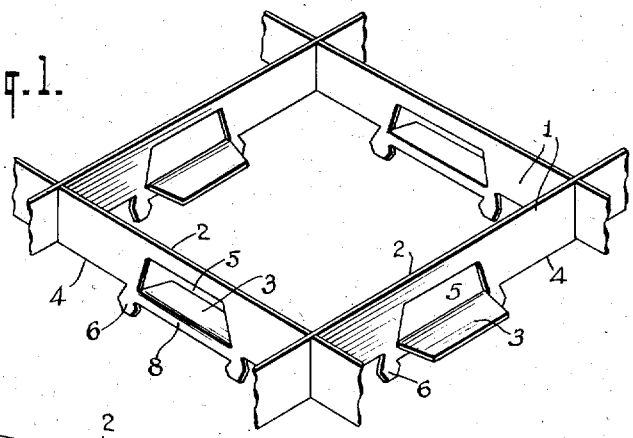
Figure 2:
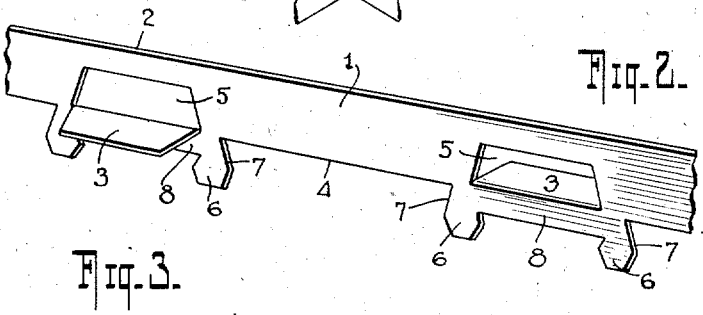
Figure 2 is a perspective view of a pattern and guide strip similar to those shown in Figure 1.
Figure 3:
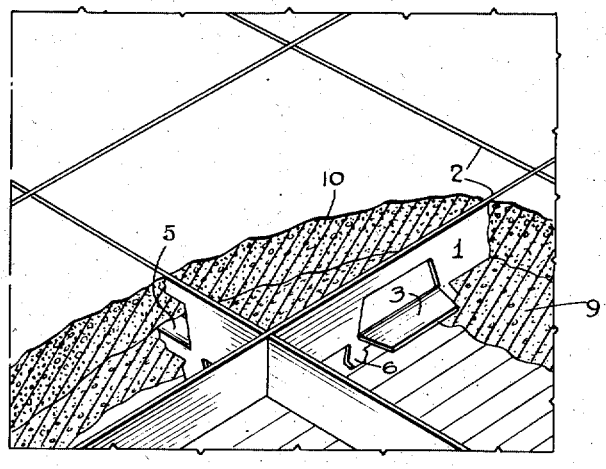
Figure 3 is a perspective view of a section of a flooring having embedded therein pattern and guide strips embodying the invention.
Figure 4:
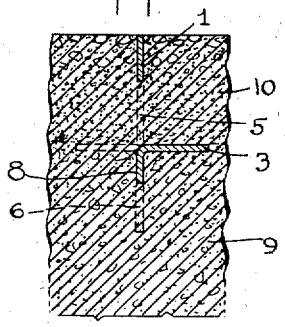
Figure 4 is a cross section of a flooring having a cement outer or wearing surface, and a pattern and guide strip similar to that shown in Figure 2.

As illustrated in the drawings, 1 represents the body of a strip of flexible material, preferably brass, having an uninterrupted upper edge 2. Flanges 3 are shown cut out from the body of the strip, and bent at a right angle to said body. The flanges 3 preferably extend longitudinally of the body of the strip with their inner margin extending substantially in line with the lower edge 4, of the strip.

Openings 5 are formed by cutting out the flanges 3, the lower margin of said openings being also in substantial alignment with the lower edge 4 of the strip.

The strip is increased in width at the parts where the openings 5 are formed, and provided with anchors 6 at the opposite ends of said openings, said anchors preferably extending in the plane of the body of the strip.

These anchors are preferably constructed with inclined upper edges 7 to aid in preventing any upward movement of the strip when the underbed has hardened around them.

The anchors 6 are connected by a bar 8, the bar and anchors constituting in effect a unitary anchor designed to hold the strip against lateral or torsional movement.

When applied to form part of a flooring or other surface, an underbed of cinders, sand and cement 9 is placed upon an arch or foundation, and while the underbed is in a semi-plastic condition the anchors 6 and 8 are pressed into the underbed until the flanges 3 bear upon the upper surface of said bed.

The novel construction of the anchors 6 and 8, lying preferably in the plane of the body of the strip, enables the anchors to be readily pressed into the underbed regardless of the coarseness of the material forming said bed.

When the anchors 6 and 8 are in place, the lower edge 4 of the strip, as well as the body of the flanges 3, lie on the top of the underbed, and the strip is held in position in and on said underbed while the top layer is being applied thereto.

While the strip is so held in position in the underbed the cement and fine sand forming the top layer 10 is placed within the sections formed by the strips, and such material passes into the openings 5 whereby the material forming adjacent sections is locked together, when the material has hardened.

When the cement material is placed within the sections formed by the guide strips, the upper edge 2 of the strips acts as leveling guides to provide an even, level, wearing surface.

By the use of a pattern and guide strip constructed as herein illustrated and described, a new structure of flooring or other surface is produced, using cement as an outer or flooring surface and an underbed of relatively coarse material.

With the pattern and guide strips heretofore used in connection with terrazzo flooring, it has been impossible to produce the result obtained by the present invention for the reason that in laying terrazzo flooring a screed coat is used that is made of relatively fine material, and the lower half of the strip is pressed into the screed coat while that coat is in a semi-plastic condition.

But such a strip can not be pressed bodily into an underbed of relatively coarse material throughout the length of the strip.

That difficulty is overcome in the present invention by arranging the body of the strip on top of the relatively coarse underbed, and by pressing the anchors only into the underbed.

The anchors moreover are so constructed as to be readily pressed into the underbed while the bed is in a semiplastic condition, notwithstanding the coarseness of the material forming the underbed, and are firmly held in place when the underbed becomes hardened around the anchors.

In laying cement floors heretofore the flooring has been commonly formed in sections by means of cut or open joints. When so constructed air enters into the joints and causes the side walls forming said joints to dry in advance of the body of the sections formed by the open joints, thereby causing cracks to form in the sections caused by the unequal tension so produced.

It is a well recognized fact that fully ninety percent of the shrinkage in such cases takes place within six inches of the outer margins of the independent sections produced by such open joints.

In the present construction such defects and disadvantages are overcome.

The underbed is not divided by cuts or joints into independent sections; on the contrary the continuity of the underbed structure is preserved, and although on its surface the top or finishing layer of concrete appears to be divided into independent sections by means of the guide strips, the sections in fact are locked together by the material forming the top layer passing through the openings 5.

While for most purposes I prefer to use an anchor consisting of the anchor plates 6 and connecting bar 8, such construction may be modified, however, without departing from the general idea of a pattern and guide strip having anchors extending below the mean lower edge of the strip adapted to anchor the strip in place, and also provided with additional material to compensate for the material cut away from the body of the strip to form the openings 5.

These strips are preferably made of brass, but other material may be used if desired, without departing from the invention.

The construction of strip shown in the drawings having flanges 3, is designed to be used in cement floorings that are divided into sections, the alternate sections having different colors.

In such constructions the sections of the same color are laid before the adjacent sections having a different color. Therefore it is important to provide means for holding the dividing strips vertically in the underbed while the first series of sections are laid, and the wings or flanges 3 are provided for that purpose. They hold the strips against any side pressure exerted against the strips while the material forming the top coat is being applied to the underbed.

But in cases where the surface layer of an entire flooring or a considerable portion thereof is of one color, the flooring need not be laid in alternate sections. The top surface may be laid in a continuous layer.

In such construction the wings or flanges 3 may be omitted, and the strips may be pressed into the flooring after the upper surface layer has been applied to the underbed.

What I claim is:

1. For use in laying cement floorings, a guide and pattern strip having an uninterrupted upper edge and a lower edge provided with a series of anchors, comprising a bar and wings connected with the ends of said bar.

2. A cement flooring having an underbed and a top layer, and guide and pattern strips having an uninterrupted upper edge, lying in the plane of the upper surface of said top layer, a lower edge provided with anchors extending below said top layer and into said underbed, the body of said strip being of a width substantially equal to the thickness of the top layer, and embedded therein, said anchors having reversely inclined edges on opposite lateral margins.

3. A cement flooring having an underbed and a top layer, and guide and pattern strips having an uninterrupted upper edge, lying in the plane of the upper surface of said top layer, a lower edge provided with anchors extending below said top layer and into said underbed, said anchors having reversely inclined edges on the same lateral margin of said anchors.

4. For use in laying cement floorings, a guide and pattern strip having an uninterrupted upper edge and longitudinally extending openings, and a lower edge provided with a series of anchors, comprising a bar and wings connected with the ends of said bar.

5. For use in laying cement floorings, a guide and pattern strip having an uninterrupted upper edge and longitudinally extending openings, and a lower edge provided with a bar increasing the width of said strip along the line of said openings, and provided also with wings having a penetrating lower edge and lateral margins extending upward and outward from said lower edge.

SEWARD HOMER CALKINS.